United States Patent [19]
Bahnsen

[11] 3,742,835
[45] July 3, 1973

[54] COLLAPSIBLE CAMERA ASSEMBLY
[76] Inventor: Gerhard I. W. Bahnsen, Box 1297, South Lake Tahoe, Calif.
[22] Filed: Apr. 2, 1970
[21] Appl. No.: 25,189

[52] U.S. Cl. ................................ 95/86, 355/21
[51] Int. Cl. ................................ G03b 17/56
[58] Field of Search ............ 95/11, 86; 355/21, 355/18

[56] References Cited
UNITED STATES PATENTS

| 2,626,845 | 1/1953 | DuBach | 108/132 |
|---|---|---|---|
| 2,112,449 | 3/1938 | Proudfit | 95/86 |
| 2,882,790 | 4/1959 | Broms | 95/86 |
| 3,228,283 | 1/1966 | Fulton et al. | 95/11 |
| 3,270,652 | 9/1966 | Mason et al. | 95/86 |
| 3,396,649 | 8/1968 | Bishop et al. | 355/21 |

Primary Examiner—John M. Horan
Attorney—William P. Green

[57] ABSTRACT

A camera assembly including a stand having a base portion adapted to rest on the ground and extend about an area to be photographed, a structure projecting upwardly from the base, and a camera mounted by the latter structure and aimed downwardly to photograph the specified area. The base of the stand includes a member extending along one side of the area to be photographed and carrying two leg units at two opposite sides of that area and mounted to the member for pivotal movement between downwardly projecting active positions and more horizontal retracted positions preferably lying in essentially the plane of the mentioned "member." The upwardly projecting camera carrying structure may also be movable to a generally horizontal retracted position to reduce the overall size of the assembly to a minimum for portability. A flash gun may be mounted to one of the leg units, preferably on an arm which itself can retract from an outwardly projecting position to a folded position of extension alongside or near the leg unit.

17 Claims, 13 Drawing Figures

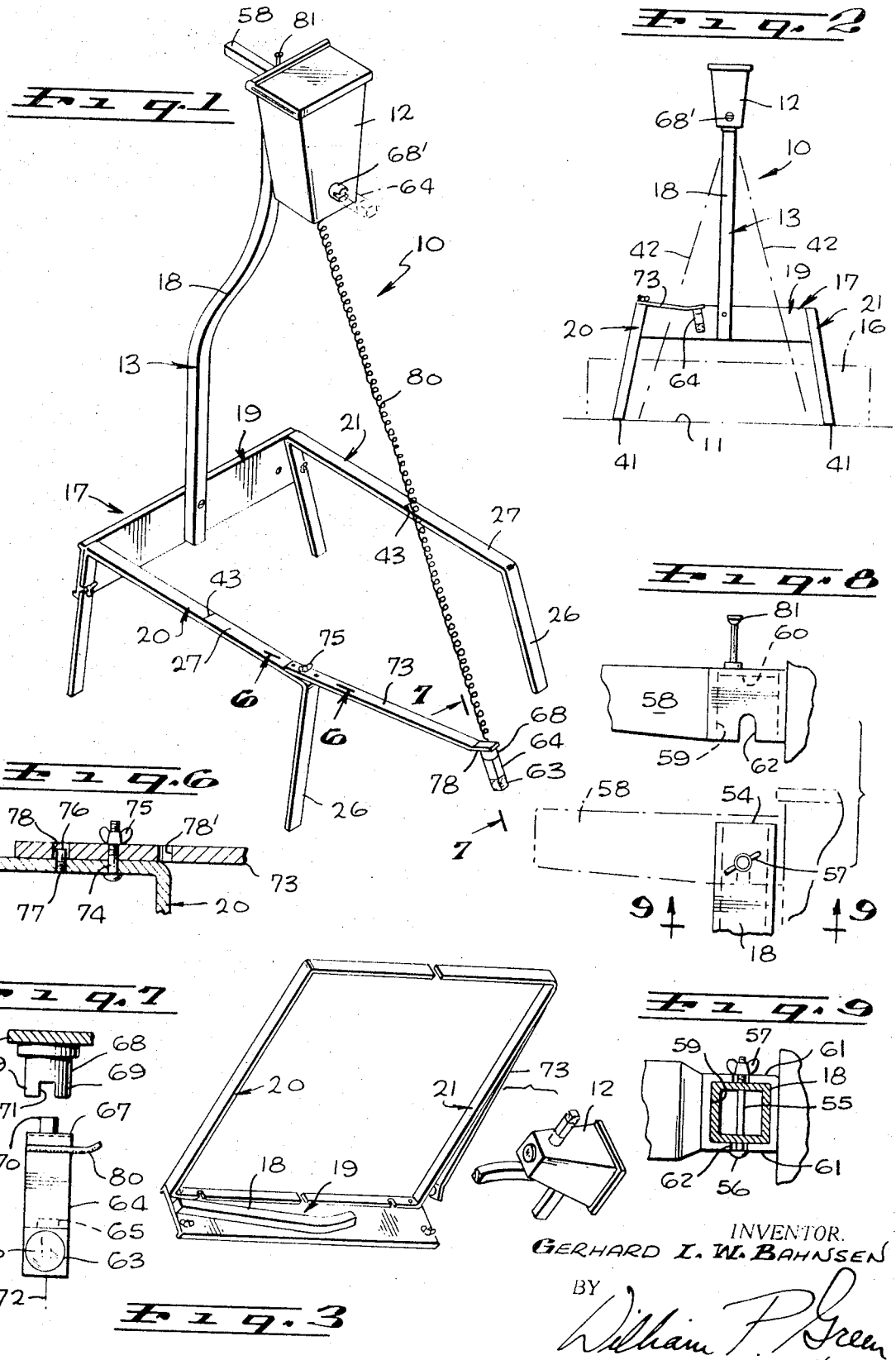

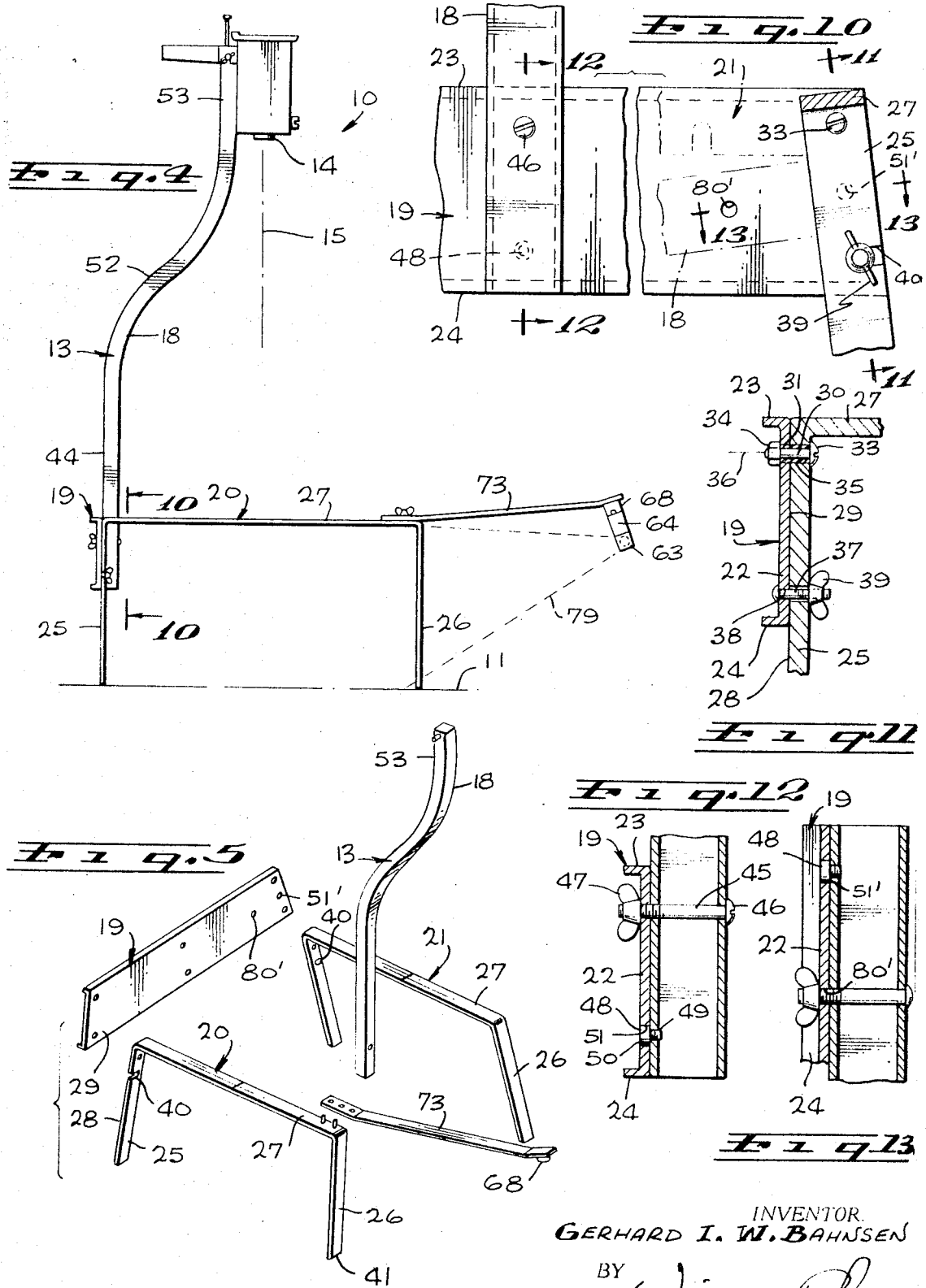

3,742,835

COLLAPSIBLE CAMERA ASSEMBLY

CROSS-REFERENCE TO RELATED APPLICATION

Certain features of the flash gun holder utilized in the present disclosure are shown and claimed in my copending application Ser. No. 25,008 filed of even date herewith on "Magnetic Flash Gun Mount," and now U.S. Pat. No. 3,641,337.

BACKGROUND OF THE INVENTION

This invention relates to photographic apparatus in which a camera is held in a predetermined position over a photographic subject by a mounting stand.

In U.S. Pat. No. 3,228,283, there has been disclosed a camera assembly including a stand which has a base portion adapted to rest on the ground or another supporting surface and extend at least partially about an area to be photographed. A supporting column or structure projects upwardly from the base and carries the camera at an upper location, with the camera directed downwardly toward the area to be photographed. The base in that prior arrangement is supported on short legs which are adapted to engage the ground in a manner spacing the remainder of the base above the ground surface.

SUMMARY OF THE INVENTION

The camera assembly of the present invention is of the same general type as that discussed above and shown in U.S. Pat. No. 3,228,283, but incorporates certain improvements facilitating use of the assembly, enhancing its portability, and attaining other advantageous results. For one thing, the invention teaches a unique improved construction for the base of the device, by virtue of which its legs are mounted to swing between downwardly projecting active positions for engagement with the ground surface, and upwardly swung retracted or inactive positions in which the legs extend more horizontally, to lie more within the same plane as the remainder of the base and thereby minimize the overall size of the base for movement from place to place. Because the legs are retractable in this manner, they may be made longer than was practical in U.S. Pat. No. 3,228,283, and thus may locate the remainder of the base sufficiently far above ground level to enable photographing of certain types of subjects whose size interfered with use of the prior device.

Structurally, the base of the stand may have a first member extending along one side of the area to be photographed, and which carries leg units mounted to the member for the desired pivotal movement between active and retracted positions. Each of the leg units preferably takes the form of an inverted U-shaped structure forming two spaced legs interconnected by a generally horizontal crosspiece, with each unit desirably being mounted to a first mentioned member of the base by a fastener or the like connecting the member to the leg unit at the location of one of the legs of that unit.

A flash gun for illuminating the area to be photographed may be mounted to one of the leg units, preferably by an arm which is movable between an outwardly projecting active position and a retracted position in which the arm is desirably located adjacent the crosspiece of one of the leg units.

The upstanding portion of the stand to which the camera proper is mounted is connected to the base in a manner enabling this upstanding portion or structure to be moved to a generally horizontal retracted position adjacent the base for carrying. Preferably, the lower end portion of the upstanding structure is connected to the base at a first location when in active position, and at an entirely different and horizontally offset position when the apparatus is in its folded or compacted condition, to minimize the extent to which the camera may project laterally beyond the base in folded condition.

BRIEF DESCRIPTION OF THE DRAWINGS

The above and other features and objects of the invention will be better understood from the following detailed description of the typical embodiment illustrated in the accompanying drawings in which:

FIG. 1 is a perspective view showing a camera assembly constructed in accordance with the invention as it appears when in use;

FIG. 2 is a reduced front view of the FIG. 1 assembly;

FIG. 3 shows the assembly of FIG. 1 in its folded or compacted condition in which it is carried from one location to another;

FIG. 4 is a side view of the FIG. 1 assembly;

FIG. 5 is a fragmentary exploded view showing certain of the component parts of the camera stand of FIG. 1;

FIG. 6 is an enlarged fragmentary vertical section taken on line 6—6 of FIG. 1;

FIG. 7 is a fragmentary section taken essentially on line 7—7 of FIG. 1, but showing the flash gun separated from its mounting magnet for clarity;

FIG. 8 shows fragmentarily the manner in which the camera is detachably secured to the upper end of the stand;

FIG. 9 is a fragmentary horizontal section taken on line 9—9 of FIG. 8;

FIG. 10 is an enlarged fragmentary view taken on line 10—10 of FIG. 4;

FIG. 11 is a section taken on line 11—11 of FIG. 10;

FIG. 12 is a fragmentary vertical section taken on line 12—12 of FIG. 10; and,

FIG. 13 is a section taken on line 13—13 of FIG. 10 with the normally upstanding camera supporting column in its inactive generally horizontal position which is shown in broken lines in FIG. 10.

DESCRIPTION OF THE PREFERRED EMBODIMENT

Referring first to FIGS. 1, 2 and 3, there is shown in those figures a camera assembly 10 which is adapted to rest on a horizontal ground surface, floor surface, or the like designated 11 in the figures. The assembly includes a camera 12 which is mounted by a stand 13 in a position in which the lens 14 of the camera is aimed directly downwardly along the vertical axis represented at 15 in FIG. 4, to take a picture of a photographic subject or object such as that illustrated very diagrammatically at 16 in FIG. 2. Since the present camera assembly is in certain respects especially adapted for use by law enforcement officers in collecting evidence relating to a particular matter, the object 16 to be photographed may be an evidenciary item whose exact location on the ground surface is of importance and is to be recorded photographically, or may be a marking such as a tire track or footprint actually formed in or on the ground surface. As indicated in FIG. 2, the object 16 may have substantial vertical thickness, in which event it is important that the stand 13 be constructed in a manner allowing the stand to straddle and avoid contact with the evidenciary item.

The stand 13 has a lower base portion 17 which rests on the ground, and an upwardly projecting camera mounting column 18. The base 17 includes a rigid horizontally elongated first member 19 extending along a rear side of the area to be photographed, and carrying two similar leg units 20 and 21 secured pivotally to the opposite ends of member 19. As seen best in FIGS. 11 and 12, member 19 is of essentially channel shaped vertical section, having a planar vertical platelike main portion 22 strengthened by provision at its upper and lower edges of two short horizontally projecting webs or ribs 23 and 24. Each of the leg units 20 and 21 is of the inverted U-shaped configuration illustrated in FIGS. 4 and 5, typically being formed of an elongated rigid strip of metal which may have the cross-section illustrated in the upper portion of FIG. 10. This metal strip forming each leg unit is deformed to the mentioned U-shaped configuration, to form two parallel downwardly projecting legs 25 and 26 interconnected by an elongated horizontally extending crosspiece 27. The crosspieces 27 of the two leg units 20 and 21 project forwardly perpendicular to the vertical plane of portion 22 of member 19, and therefore extend parallel to one another in laterally spaced relation to define the opposite sides of the rectangular area to be photographed. As previously indicated, member 19 defines the rear side of that rectangular photographic area, while the base 17 is open across the forward side of the area (between the two legs 26).

The rear leg 25 of each leg unit 20 or 21 has a back surface 28 which lies in the same vertical plane as, and abuts movably against, the forward vertical face 29 of member 19, to thus effectively locate the leg units in their illustrated positions relative to member 19. Surfaces 28 and 29 are retained in such engagement by a pivot screw 30 (FIG. 11), which extends through registering circular apertures 31 in member 19 and leg 25, and which has a head 33 bearing rearwardly against the leg, and a nut 34 bearing forwardly against the back side of portion 22 of member 19. About the shank of screw 30, there may be provided a tubular bushing sleeve 35, which is a close fit about the screw and a close fit within openings 31 to mount the leg unit 20 or 21 for only a desired pivotal type of movement relative to member 19 and about the horizontal axis represented at 36 in FIG. 11. Sleeve 35 may be of a length very slightly longer than the combined thicknesses of portion 22 of member 19 and leg 25, to allow such pivotal movement even when nut 34 is tightened on screw 30.

The discussed pivotal mountings of the two leg units 20 and 21 enable those leg units to be swung about two parallel axes 36 between the active downwardly projecting positions of FIGS. 1, 2 and 4 and the upwardly swung inactive positions of FIG. 3, in which the legs of the two units 20 and 21 project toward one another and are aligned horizontally with one another and lie in essentially the same horizontal plane as member 19. The leg units may be retained in their active downwardly projecting positions by two screws 37 (FIGS. 1, 10 and 11), which are carried within openings 38 in portion 22 of member 19, and have heads bearing against the rear side of member 19, and which carry wingnuts 39 at the forward ends of screws 37. At their outer sides, legs 25 of the two leg units contain laterally opening notches 40, within which screws 37 are received when the legs are swung laterally to their active FIG. 1 positions. Tightening of wingnuts 39 then clamps the leg units in those FIG. 1 positions until purposely released by unscrewing of the wingnuts. Notches 40 may be slightly curved arcuately about their related axes 36 in order to best receive screws 37 when legs 25 are swung about those axes.

As best seen in FIG. 2, the legs 25 and 26 in their active positions do not project directly vertically downwardly, but rather the legs of the two units are inclined laterally outwardly in opposite directions but at equal angles to diverge or advance away from one another between their upper cross piece portions 27 and their lower ground engaging extremities 41. This angle of downward divergence of the leg units corresponds generally to, or is similar to, the angle of downward flare of the field of view of the camera as represented in FIG. 2. In that figure, the lateral extremities of the field of view of the camera are represented at 42, and as will be apparent, the similar downward flare of the two leg units allows for a reduction in the necessary length of member 19 while still avoiding interference of any of the portions of the leg units with the area to be photographed. Further, the slight outward flare of the leg units 20 and 21 relative to one another increases the rigidity of the overall structure, and prevents the leg units from accidentally swinging inwardly from their downwardly projecting active positions to their upwardly swung inactive positions of FIG. 3. As seen in FIGS. 1, 2 and 5, the lower edges 41 of the legs are cut off horizontally in a common horizontal plane to rest on ground surface 11. Two aligned markings 43 on the upper sides of crosspieces 27 of the leg units are located at the midpoints of those crosspieces and locate for a user the center of the area to be photographed, and therefore the position at which the photographic subject 11 is desirably to be located.

The support column 18 may be formed of square cross-section metal tubing (see FIG. 9), and has a lower portion 44 (FIG. 4) which extends upwardly at the forward side of member 19 in close engagement therewith. The back surface of this portion 44 of column 18 lies in the same vertical plane as the previously mentioned forward face 29 of portion 22 of member 19 and is held tightly thereagainst by a screw 45 (FIG. 12), which extends through registering apertures in the tubular column 18 and portion 22 of member 19. Screw 45 has a head 46 bearing rearwardly against the front wall of tube 18, and has a wingnut 47 tightenable forwardly against member 19 to hold the column 18 in its desired upwardly projecting active position. At a location spaced beneath but in vertical alignment with screw 45, the rear wall of square tubing 18 carries a locating screw or pin 48, whose shank 49 is threadedly connected into the rear wall of tube 18, and whose externally cylindrical head 50 is received within and located by a correspondingly dimensioned circular opening 51 formed in member 19. The screw 48 is permanently secured to column 18 and can be withdrawn from opening 51 upon loosening the screw 45. Thus, when the head of screw 48 is received within opening 51, and wingnut 47 is tightened on screw 45, the column 18 is very positively and rigidly retained in upwardly projecting position relative to member 19.

Above its vertical portion 44, the column or tube 18 curves gradually inwardly or forwardly at 52 (FIG. 4)

and then curves upwardly again to extend directly vertically at 53. Near its upper horizontal edge 54, tube 18 carries a horizontally extending screw 55 (FIG. 9), having a head 56 at one side of the tube and a wingnut 57 at the other side. The camera 12 has a rearwardly projecting handle 58, which at its forward end contains a socket recess 59 of square horizontal section adapted to fit closely over and about the upper end of square tube 18 (FIGS. 8 and 9), with the upper edge 54 of tube 18 abutting upwardly against the horizontal undersurface 60 of a top wall of the socket recess. The opposite side walls 61 of the socket recess 59 contain notches 62 (FIGS. 8 and 9), within which the opposite ends of screw 55 are received when the camera is in its FIG. 1 active position. Tightening of wingnut 57 causes that wingnut and head 56 of screw 55 to engage tightly against the opposite sides of walls 61, to tightly but releasably clamp the camera in position on column 18.

The camera is desirably of a fixed focus type, in which lens 14 is adapted to form on a film within the camera a focused image of an object located at the level of the object 16 in FIG. 2. The depth of field of lens 14 is such that anything on the level of ground surface 11 is in focus, as is anything thereabove up to the level of the top crosspiece portions 27 of leg units 20 and 21. Also, the characteristics of the lens and its shutter are such as to produce a properly illuminated picture, on a predetermiend type of film, upon firing of one of the cells of a flashcube 63 carried by a flash gun 64 when the flash gun is mounted at either the broken line position or full line position of FIG. 1.

Flash gun 64 may be of a conventional construction having a socket 65 (FIG. 7) into which flash cube 63 is connectible, and by which the cube is automatically turned between a series of positions in which different ones of its four cells 66 are directed toward the photographic subject area. Alternatively, other types of flash guns utilizing other bulbs or electronic flashing equipment may be employed. At its rear side, the flash gun has a mounting plate 67 formed of iron or other magnetic metal, and which is releasably retained in position by a circular magnet 68 in a manner taught in my above mentioned U.S. Pat. No. 3,641,337. Between the two poles 69 of magnet 68, there is provided an elongated notch or recess 71 within which a correspondingly elongated projection 70 on element 67 is receivable. When element 67 is connected magnetically to and retained by magnet 68, the reception of projection 70 within notch 71 between the two poles locates the flash gun in a manner holding it in a fixed orientation relative to the magnet, and against turning about the axis 72 of the flash gun, and in a relation such that the next flash cube cell to be fired is directed very accurately toward the area to be photographed.

Magnet 68 is carried at an end of a mounting arm 73 which is removably attachable to the outer portion of crosspeice 27 of leg unit 20, near the upper end of its outer leg 26. Arm 73 may be formed of a rigid metal strip similar to the strips from which leg units 20 and 21 are formed, and is secured to the upper side of cross piece 27 of leg unit 20 by a screw 74 which extends upwardly through registering apertures in the connected parts, and which carries a wingnut 75 at its upper end. A pin 76 has its lower end 77 threadedly connected into crosspiece 27 of leg unit 20, and is receivable within a circular opening 78 formed in arm 73 to hold the arm in the FIG. 1 fixed position of outward projection relative to the leg unit. In this position, the arm 73 is preferably not aligned directly with crosspiece 27 of leg unit 20, but rather, as viewed in plan, advances laterally inwardly as it advances outwardly away from member 19. Also, the outer extremity of arm 73 may be turned upwardly at a slight angle as illustrated at 78 in FIG. 4, to dispose the flash cube at an angle at which its light beam 79 will be directed somewhat downwardly for optimum side illumination of the photographic subject. The flash gun may be energized by batteries contained within its interior and may be fired in synchronism with the opening of the camera lens 14 by a signal transmitted to the flash gun through a coiled flexible wire 80.

When the assembly of the figures is in its FIG. 3 collapsed condition, arm 73 is swung through somewhat less than 180° to a position of reception adjacent, and extension along the upper side of, crosspiece 27 of leg unit 20. In that condition, the arm 73 is still retained by screw 74 of FIG. 6, but pin 76 attached to the leg unit is received within a second aperture 78' in arm 73, to locate the arm in its retracted position. Such movement of the arm between its active and retracted positions is permitted by unscrewing nut 75, then lifting arm 73 enough to free it from engagement with pin 76, and moving the arm 73 downwardly in a properly changed position in which the pin 76 is received within the second aperture 78'.

When it is desired to illuminate a photographic subject from the upper side, rather than from the outer end of arm 73, the flash gun is removed from magnet 68 and attached to a second magnet 68' which is rigidly carried on the front face of the camera 12. This magnet 68' is of the same construction as magnet 68, and has the same interfitting relationship with the projection 70 on element 67 of the flash gun, and when in retained interfitting relation with the flash gun holds the gun in a predetermined proper orientation in which the cell of flash cube 63 which is next to be fired is aimed directly toward the photographic area defined within elements 19, 20 and 21, to illuminate that entire area.

In converting the apparatus from the FIG. 1 active condition to the FIG. 3 collapsed or portable condition, the camera mounting column 18 is completely detached from member 19, and then reattached to that member in a position of essentially horizontal extension lying essentially within the horizontal plane of member 19. For this purpose, member 19 contains a second pair of apertures 51' and 80' corresponding to the apertures 50 and 80 of FIG. 12, and adapted to receive the head of pin or screw 48 and a portion of screw 45 respectively, as illustrated in FIG. 13, to rigidly hold column 18 and the carried camera in the FIG. 3 position.

To summarize briefly the manner of use of the illustrated assembly, assume that the apparatus is initially in the condition as shown in FIG. 1, and that it is desired to photograph the subject represented at 16 in FIG. 2, resting on ground surface 11. A user merely lifts the entire assembly by grasping handle 58 of the camera, and after moving the assembly to a position above the object to be photographed, the assembly is lowered as shown in FIG. 2 with the subject 16 being aligned centrally by reference to markings 43 on the leg units, and with the U-shaped leg units staddling the subject. If it is desired to produce a photograph with shadows, the flash gun 64 is mounted to the end of arm 73 as shown in FIG. 1, whereas if a front lighted picture is desired, the flash gun is mounted to magnet 68' on the camera. The operator then actuates the camera by depressing the firing button 81, so that the lens is opened and the flash gun is simultaneously fired to properly expose the film within the camera to produce a picture of the illuminated photographic area. After the photograph has been taken, the assembly can easily be converted to the FIG. 3 readily transportable condition by first detaching column 18 from member 19, then loosening wingnuts 39 and swinging the two leg units 20 and 21 to their FIG. 3 positions, loosening wingnut 75 to permit arm 73 to be swung to its FIG. 3 position of extension alongside crosspiece 27 of leg unit 20, and then reattaching column 18 and the carried camera to member 19 in the FIG. 3 position. It is noted that in this FIG. 3 position, the column 18 is so located as to retain leg units 20 and 21 in their retracted positions and against swinging movment to their active positions.

While a certain specific embodiment of the present invention has been disclosed as typical, the invention is of course not limited to this particular form, but rather is applicable broadly to all such variations as fall within the scope of the appended claims.

I claim:

1. The combination comprising a base constructed to rest on the ground or another surface and extend essentially about an area within which a photographic subject is to be located, a structure projecting upwardly from and supported by said base, and a camera carried by said structure at a location spaced above the ground and directed downwardly to take a picture of a photographic subject in said area, said base including a first member extending along a first side of said area, leg units mounted for pivotal movement relative to said first member between first active positions in which they project downwardly to rest on the ground and second inactive positions in which they extend more horizontally, fastener means adapted to extend through registering apertures in said member and said structure in either an upwardly projecting active position or a generally horizontally extending inactive position of said structure, and pin and recess means on said member and said structure interfitting to coact with said fastener means in locating said structure in either of said positions thereof.

2. The combination comprising a base constructed to rest on the ground or another surface adjacent an area within which a photographic subject is to be located, a structure projecting upwardly from and supported by said base, a camera carried by said structure at a location spaced above the ground and directed downwardly to take a picture of a photographic subject in said area, an arm movable between an active position in which it projects outwardly from said base and a retracted position closer to the base, a flash gun, and means for mounting said flash gun to said arm at a location spaced outwardly from said base when said arm is in said active position and in an orientation to direct light onto said photographic subject, said mounting means including a fastener extending through registering apertures in said arm and said base to retain said arm to said base in either of said positions, and interfitting pin and recess means on said arm and base interfitting to locate and retain said arm in both of said relative positions.

3. The combination comprising a base constructed to rest on the ground or another surface adjacent an area within which a photographic subject is to be located, a structure which in an active position projects upwardly from said base, a camera carried by said structure in said active position at a location spaced above the ground and directed downwardly to take a picture of a photographic subject in said area, and means for connecting a lower end of said structure to said base at a first location with said structure projecting upwardly in said active position, and for alternatively connecting said lower end of the structure to said base at a second location with said structure extending more horizontally in a retracted position, said last mentioned means including a fastener for extending through registering apertures in said structure and base in said active position and in said retracted position, and interfitting pin and recess means coacting with said fastener to locate and retain said structure in said positions.

4. The combiantion comprising a base constructed to rest on the ground or another surface adjacent an area within which a photographic subject is to be located, a structure which in an acitve position projects upwardly from said base, a camera carried by said structure in said active position at a location spaced above the ground and directed downwardly to take a picture of a photographic subject in said area, and means for connecting a lower end of said structure to said base at a first location with said structure projecting upwardly in said active position, and for alternatively connecting said lower end of the structure to said base at a second location with said structure extending more horizontally in a retracted position, said last mentioned means including two differently oriented pairs of sapced apertures in said base, a fastener which extends through an opening in said structure and through one of said apertures of said first pair in said active position, and which extends through said opening in said structure and through one of said apertures in the second pair in said retracted position, and a pin on said structure which is received in the second aperture of said first pair in said active position and in the second aperture of said second pair in said retracted position.

5. The combination comprising a camera structure and a stand structure for supporting said camera structure, said camera structure having a handle and having a socket recess formed in the camera structure near said handle, said stand structure having a projection removably receivable in said socket recess to interconnect said structures, a screw extending transversely through and carried by said projection, said socket recess having side walls at opposite sides of said projection containing notches for receiving opposite ends of said screw when the structures are interconnected, said screw having a head at one end and a nut at its opposite end tightenable against said two side walls respectively to retain the camera structure against detachment from said stand structure.

6. The combination comprising a base constructed to rest on the ground or another surface and extend essentially about an area within which a photographic subject is to be located, a structure projecting upwardly from and supported by side base, and a camera carried by said structure at a location spaced above the ground and directed downwardly to take a picture of a photographic subject in said area, said base including a first member extending along a first side of said area, leg units mounted for pivotal movement relative to said first member between first active positions in which they project downwardly to rest on the ground and second inactive positions in which they extend more horizontally, each of said leg units being essentially an inverted U-shaped member having two legs which in said active position project downwardly, and having a crosspiece extending generally horizontally between siad legs at a location spaced above the ground, a pivotal connection between said first member and an upper portion of one leg of each unit, and a fastener carried by said first member and received within a slot in said one leg in its active position and tightenable to retain said one leg in active position.

7. The combination comprising a base constructed to rest on the ground or another surface and extend essentially about an area within which a photographic subject is to be located, a structure projecting upwardly from and supported by said base, and a camera carried by said structure at a location spaced above the ground and directed downwardly to take a picture of a photographic subject in said area, said base including a first member extending along a first side of said area, leg units mounted for pivotal movement relative to said first member between first active positions in which they project downwardly to rest on the ground and second inactive positions in which they extend more horizontally, each of said leg units being essentaily an inverted U-shaped member having two legs which in said active position project downwardly, and having a crosspiece extending generally horizontally between said legs at a location spaced above the ground, and a pivotal connection between said member and each of said leg units at a location adjacent one of said legs of the unit, there being an arm mounted to one of said leg units at a location spaced from said member and near an outer leg thereof and movable between an outwardly projecting active position and a retracted position of extension alongside the crosspiece of said one unit, and means near an outer end of said arm for detachably holding a flash gun.

8. The combination comprising a base constructed to rest on the ground or another surface and extend essentially about an area within which a photographic subject is to be located, a structure projecting upwardly from and supported by said base, and a camera carried by said structure at a location spaced above the ground and directed downwardly to take a picture of a photographic subject in said area, said base including a first member extending along a first side of said area, leg units mounted for pivotal movement relative to said first member between first active positions in which they project downwardly to rest on the ground and second inactive positions in which they extend more horizontally, and means for mounting a flash gun to one of said leg units at a location to illuminate said area, said flash gun mounting means including an arm mounted to one of said leg units for movement between an outwardly projecting position and a retracted position closer to the leg unit, and means carried by said arm for holding a flash gun at a location to illuminate said area.

9. The combination comprising a base constructed to rest on the ground or another surface and extend essentially about an area within which a photographic subject is to be located, said base including a first member extending generally horizontally along a first side of said area, two leg units projecting generally horizontally from said member at spaced locations near opposite ends thereof and extending along two opposite sides respectively of said area, each of said leg units being of essentially an inverted U-shaped configuration having two legs and a crosspiece extending generally horizontally therebetween, two pivotal connections attaching said leg units to said member near said opposite ends thereof for pivotal movement between first active positions in which said legs project downwardly to rest on the ground and second inactive positions in which said legs extend more horizontally, each of said pivotal connections being attached to the corresponding leg unit at approximately the location of one of said legs thereof, with the major portion of each leg unit projecting outwardly from and beyond said member as a cantilever not directly attached to said member beyond said pivotal connection which attaches that leg unit to said member, a camera mounting structure projecting from and supported by said member, and a camera carried by said mounting structure at a location spaced above the ground and directed downwardly to take a picture of a photographic subject in said area.

10. The combination as recited in claim 9, including means for mounting a flash gun to one of said leg units at a location to illuminate said area.

11. The combination as recited in claim 9, including means engageable by said leg units to limit the pivotal movement of said units at said active positions.

12. The combination as recited in claim 9, in which said legs of each leg unit diverge away from the legs of the other leg unit in said active positions thereof.

13. The combination as recited in claim 9, including fastener means for limiting pivotal movement of said leg units at said active positions thereof and tightenable to releasably retain said units in said active positions.

14. The combination as recited in claim 9, in which said camera mounting structure projects upwardly from said first member at a location between said leg units and said pivotal connections.

15. The combination as recited in claim 9, including means for securing said mounting structure to said first member in either an upwardly projecting camera mounting positin or a generally horizontally extending retracted position near said first member.

16. The combination comprising a base constructed to rest on the ground or another surface and extend essentaially about an area within which a photographic subject is to be located, said base including a first member extending generally horizontally along a first side of said area, two leg units projecting generally horizontally from said member at spaced locations near opposite ends thereof and extending along two opposite sides respectively of said area, each of said leg units being of essentially an inverted U-shaped configuration having two legs and a crosspiece extending generally horizontally therebetween, two pivotal connections attaching said leg units to said member for pivotal movement between first active positions in which said legs project downwardly to rest on the ground and second inactive positions in which said legs extend more horizontally, each of said pivotal connections being attached to the corresponding leg unit at approximately the location of one of said legs thereof, a camera mounting structure projecting upwardly from and supported by said member, a camera carried by said mounting structure at a location spaced above the ground and directed downwardly to take a picture of a photographic subject in said area, an arm mounted to one of said leg units for movement between an active position in which it projects outwardly from said leg unit and a retracted position closer to the leg unit, a flash gun, and means for mounting said flash gun to said arm at a locaton spaced outwardly from said leg units when said arm is in said active position thereof and in an orientation to direct light onto said photographic subject.

17. The combination as recited in claim 16, in which said arm in retracted position is located to extend essentially along and adjacent said crosspiece of one of the leg units.

* * * * *